(12) United States Patent
Lee

(10) Patent No.: US 11,293,287 B2
(45) Date of Patent: Apr. 5, 2022

(54) AIRFOIL AND GAS TURBINE HAVING SAME

(71) Applicant: DOOSAN HEAVY INDUSTRIES & CONSTRUCTION CO., LTD., Changwon-si (KR)

(72) Inventor: Chang Yong Lee, Sejong-si (KR)

( * ) Notice: Subject to any disclaimer, the term of this patent is extended or adjusted under 35 U.S.C. 154(b) by 11 days.

(21) Appl. No.: 16/875,967

(22) Filed: May 15, 2020

(65) Prior Publication Data

US 2020/0386102 A1    Dec. 10, 2020

(30) Foreign Application Priority Data

Jun. 10, 2019 (KR) .......................... 10-2019-0068123

(51) Int. Cl.
*F01D 5/18* (2006.01)
*F01D 25/12* (2006.01)
*F02C 7/16* (2006.01)

(52) U.S. Cl.
CPC ............... *F01D 5/18* (2013.01); *F01D 25/12* (2013.01); *F02C 7/16* (2013.01); *F05D 2220/32* (2013.01);
(Continued)

(58) Field of Classification Search
CPC . F01D 25/12; F01D 5/081; F01D 5/18; F01D 5/187; F01D 9/02; F02C 7/16; F05D 2220/32; F05D 2240/12; F05D 2240/30; F05D 2260/20; F05D 2260/221; F05D 2260/2212; F05D 2260/22141
See application file for complete search history.

(56) References Cited

U.S. PATENT DOCUMENTS 6,186,741 B1 * 2/2001 Webb ...................... F01D 5/187
                                                          416/96 R
6,416,275 B1 * 7/2002 Itzel ....................... F01D 5/189
                                                          415/116
(Continued)

FOREIGN PATENT DOCUMENTS

EP          1 734 229       12/2006
JP          55117008 A       9/1980
(Continued)

OTHER PUBLICATIONS

Japan Office Action dated Apr. 20, 2021.
(Continued)

*Primary Examiner* — Jesse S Bogue
(74) *Attorney, Agent, or Firm* — Harvest IP Law, LLP

(57) ABSTRACT

An airfoil of either of a turbine blade or a turbine vane includes a cooling passage; at least one disk body disposed on an inner wall of the cooling passage and configured to reduce a flow cross-sectional area of the cooling passage to increase a fluid pressure of cooling fluid flowing through the cooling passage; and at least one through-hole formed in each of the at least one disk body such that the cooling fluid flows through the at least one through-hole and forms a vortex on a downstream side of the at least one through-hole. The cooling passage includes an inlet supplied with the cooling fluid and an end opposite to the inlet, and the at least one disk body is disposed at the inlet of the cooling passage and is configured to increase the fluid pressure of the cooling fluid flowing into the cooling passage.

19 Claims, 13 Drawing Sheets

(52) U.S. Cl.
CPC ...... *F05D 2240/12* (2013.01); *F05D 2240/30* (2013.01); *F05D 2260/20* (2013.01)

(56) References Cited

U.S. PATENT DOCUMENTS

| | | |
|---|---|---|
| 7,563,072 B1 | 7/2009 | Liang |
| 7,967,563 B1 | 6/2011 | Liang |
| 8,231,350 B1 | 7/2012 | Liang et al. |
| 8,506,252 B1 | 8/2013 | Liang |
| 8,702,391 B2 | 4/2014 | Bregman et al. |
| 9,188,016 B2 * | 11/2015 | Carrier ............... F01D 9/02 |
| 2003/0026689 A1 | 2/2003 | Burdgick et al. |
| 2007/0189898 A1 * | 8/2007 | Hooper ............ F01D 5/187 |
| | | 416/97 R |
| 2018/0119553 A1 * | 5/2018 | Ucasz ............... B22F 5/04 |
| 2020/0271056 A1 * | 8/2020 | Kim ................. F01D 5/186 |
| 2020/0400031 A1 * | 12/2020 | Joo .................. F01D 9/02 |

FOREIGN PATENT DOCUMENTS

| | | |
|---|---|---|
| JP | 04104101 U | 9/1992 |
| JP | 2017150333 A | 8/2017 |
| KR | 10-1464988 B1 | 11/2014 |
| KR | 10-2010-0064754 A | 6/2020 |

OTHER PUBLICATIONS

Search Report issued by European Patent Office dated Nov. 11, 2020.

JP Decision to Grant.

* cited by examiner

AIRFOIL AND GAS TURBINE HAVING SAME

CROSS REFERENCE TO RELATED APPLICATION

The present application claims priority to Korean Patent Application No. 10-2019-0068123, filed on Jun. 10, 2019, the entire contents of which are incorporated herein for all purposes by this reference.

BACKGROUND OF THE DISCLOSURE

1. Field of the Invention

The present disclosure relates to an airfoil and a gas turbine having the same.

2. Description of the Background Art

Generally, turbines, such as steam turbines, gas turbines, and the like, are machines that obtain rotating force with impulsive force using a flow of a compressed fluid such as gas.

A gas turbine generally includes a compressor, a combustor, and a turbine. The compressor has a compressor casing in which compressor vanes and compressor blades are alternately arranged, along with an air inlet. The combustor serves to supply fuel to compressed air from the compressor and ignite the air-fuel gas with a burner to produce high temperature and high pressure combustion gas. The turbine has a turbine casing in which turbine vanes and turbine blades are alternately arranged.

A rotor is centrally disposed through the compressor, the combustor, the turbine, and an exhaust chamber. The rotor is rotatably supported by bearings at opposite ends of the rotor. Blades are respectively fixed to each of a plurality of disks fixed to the rotor, and a driving shaft of a driving unit, such as a generator or the like, is coupled to the exhaust chamber side of the rotor.

Since such a gas turbine is devoid of a reciprocating mechanism such as a piston of a four-stroke engine, there are no friction-causing features such as piston-cylinder contact parts, and thus the turbine has advantages of a significant reduction in lubricant consumption and amplitude of vibration, which are characteristic of a reciprocating mechanism, whereby high speed movement is enabled.

In the operation of the gas turbine, air compressed by the compressor is mixed with fuel and combusted in the combustor to provide hot combustion gas, which is then injected towards the turbine. As the injected combustion gas passes through the turbine vanes and the turbine blades, a rotating force is created and the rotor rotates.

SUMMARY OF THE DISCLOSURE

An objective of the present disclosure is to provide an airfoil having improved cooling efficiency, and a gas turbine including the improved airfoil.

According to an aspect of the present invention, there is provided an airfoil including a cooling passage; at least one disk body disposed on an inner wall of the cooling passage and configured to reduce a flow cross-sectional area of the cooling passage to increase a fluid pressure of cooling fluid flowing through the cooling passage; and at least one through-hole formed in each of the at least one disk body such that the cooling fluid flows through the at least one through-hole and forms a vortex on a downstream side of the at least one through-hole.

The cooling passage may include an inlet supplied with the cooling fluid and an end opposite to the inlet. The at least one disk body may be disposed at the inlet of the cooling passage and is configured to increase the fluid pressure of the cooling fluid flowing into the cooling passage. The at least one through-hole may include a plurality of through-holes, and the at least one disk body may include a plurality of disk bodies, each of the plurality of disk bodies having the at least one through-hole.

The plurality of disk bodies may include a first disk body disposed at the inlet of the cooling passage; and a second disk body disposed in the cooling passage between the first disk body and end of the cooling passage opposite the inlet. Each of the plurality of through-holes may have an equal size, and the second disk body may have fewer through-holes than the first disk body; or each of the first and second disk bodies may have an equal number of through-holes, and each of the plurality of through-holes formed in the second disk body may be smaller than any one of the plurality of through-holes of the first disk body.

The plurality of through-holes may be configured such that a number of through-holes of the plurality of through-holes multiplied by a size of each of the plurality of through-holes equals a through area of a corresponding disk body of the plurality of disk bodies, and the through area of the second disk body is smaller than the through area of the first disk body.

Each of the at least one through-hole may be formed in a direction parallel to a radial direction of the airfoil, may be formed in a direction inclined at a predetermined angle with respect to a radial direction of the airfoil, may have a frustoconical shape with a wide lower portion and a narrow upper portion, or may have a bowtie cross-sectional shape formed of a lower frustoconical part and an upper frustoconical part, the lower frustoconical part of the through-hole having a wide lower portion and a narrow upper portion and the upper frustoconical part of the through-hole being an inversion of the lower frustoconical part and having a wide upper portion and a narrow lower portion.

The airfoil may further include a cooling rib disposed on the inner wall of the cooling passage downstream of the at least one disk body, the cooling protruding into the cooling passage and being configured to form an additional vortex in the cooling fluid that passes through the at least one disk body.

The inlet of the cooling passage may include a first inlet supplied with a first portion of the cooling fluid and a second inlet supplied with a second portion the cooling fluid and an end opposite to the inlet, and the at least one disk body may be disposed at each of the first and second inlets of the cooling passage and may be configured to increase the fluid pressure of each of the first and second portions of the cooling fluid flowing into the cooling passage.

The cooling passage may be formed by a linear passage structure and a serpentine passage structure forming a combined extension configuration with the linear passage structure, the linear passage structure configured to communicate with the first inlet, the serpentine passage structure configured to communicate with the second inlet. The linear passage structure and the serpentine passage structure may communicate with each other via the flow apertures formed in the inner wall of the cooling passage. The linear passage structure of the cooling passage may extend from a bottom to a top of the airfoil and terminates at the top, and the serpentine passage structure of the cooling passage may alternately extend from the bottom to the top and from the top to the bottom of the airfoil.

According to another aspect of the present invention, there is provided a gas turbine including a compressor configured to compress an incoming air; a combustor configured to produce combustion gas by mixing the compressed air with fuel and combusting an air-fuel mixture; and a turbine configured to generate power from the combustion gas. The turbine may include a turbine vane for guiding the combustion gas along a path through which the combustion gas flows, and a turbine blade for rotating with the combustion gas flowing through the path. At least one of the turbine vane and the turbine blade may include an airfoil consistent with the above-described airfoil.

The turbine blade may include a root part fastened to a turbine rotor disk of the turbine, and the airfoil may be integrally formed with the root part such that the airfoil is positioned on an upper portion of the root part so as to be rotated by the combustion gas.

The airfoil of the turbine vane may be disposed between an outer shroud and an inner shroud of the turbine, and the cooling fluid may flow into the airfoil through at least one fluid inlet formed in the inner or outer shroud.

As described above, according to the airfoil and the gas turbine including the same, the cooling performance of the airfoil can be improved by forming a vortex in the cooling fluid flowing into the cooling passage.

DETAILED DESCRIPTION OF THE DISCLOSURE

Figure 1:
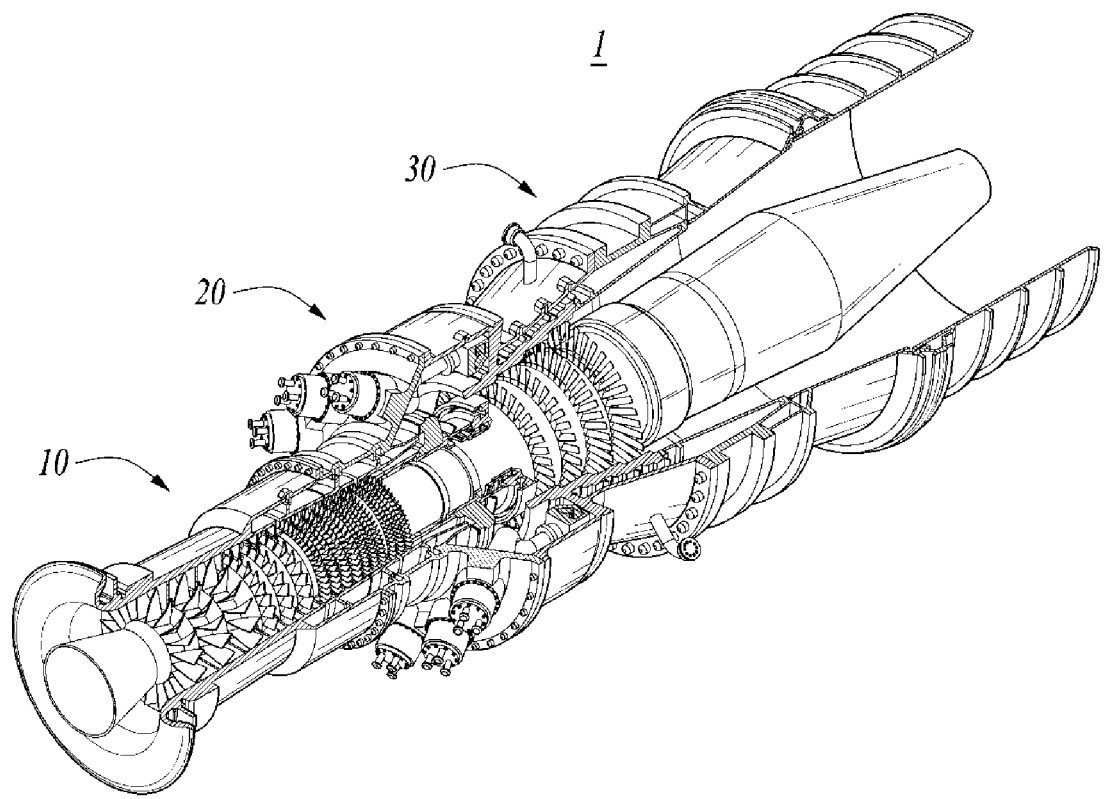
FIG. 1 is a cutaway perspective view of a gas turbine in which may be applied a turbine blade including an airfoil according to the present disclosure.

A turbine blade and a gas turbine having the same according to exemplary embodiments of the present disclosure will now be described in detail with reference to the accompanying drawings. However, the present disclosure is not limited to embodiments disclosed below, but may be implemented in various different forms. The disclosed embodiments are provided to allow the present disclosure to be complete, and those skilled in the art to completely understand the scope of the present disclosure.

Also, throughout the specification, when a part "includes" a certain component, this means that the part may further include other components rather than excluding them unless stated otherwise. In addition, throughout the specification, "an element is positioned on a target part" means that the element is not necessarily positioned above the target part in the gravity direction, but is positioned merely above or below the target part.

Hereinafter, preferred exemplary embodiments of the present disclosure will be described in detail with reference to the accompanying drawings. In the following description, it is to be noted that when the functions of conventional elements and the detailed description of elements related with the present invention may make the gist of the present invention unclear, a detailed description of those elements will be omitted. Wherever possible, the same reference numerals will be used throughout the drawings and the description to refer to the same or like parts. When referring to the drawings, it should be understood that the shape and size of the elements shown in the drawings may be exaggerated to provide an easily understood description of the structure of the present disclosure.

Figure 2:
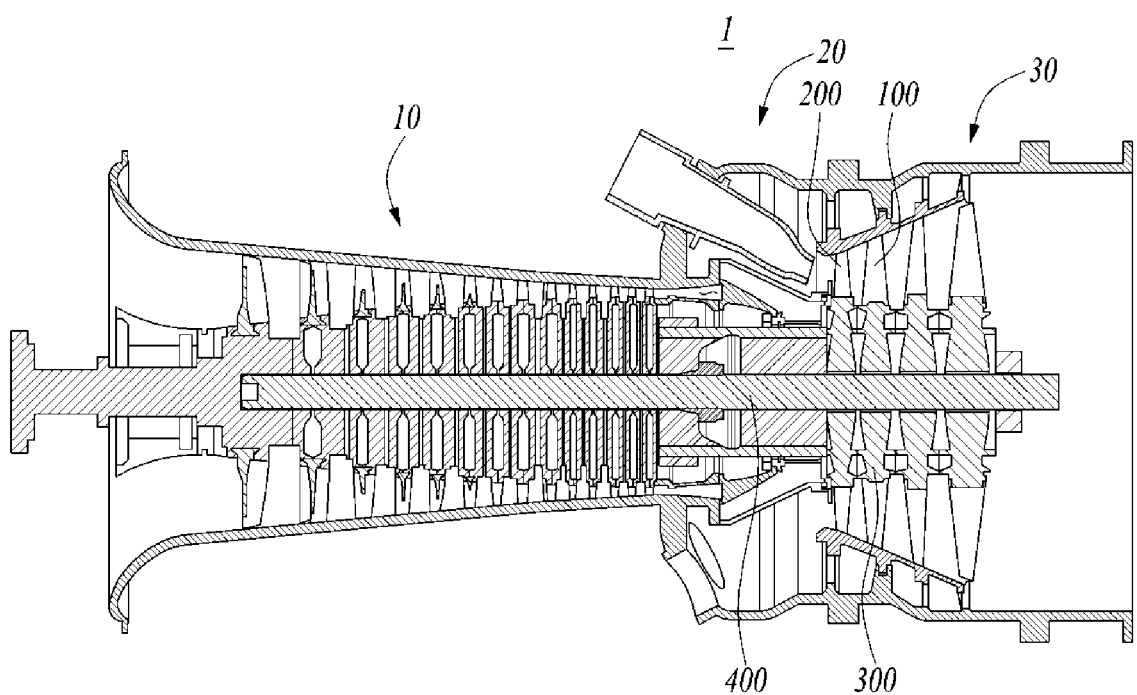
FIG. 2 is a cutaway sectional view of the gas turbine of FIG. 1.
Figure 3:
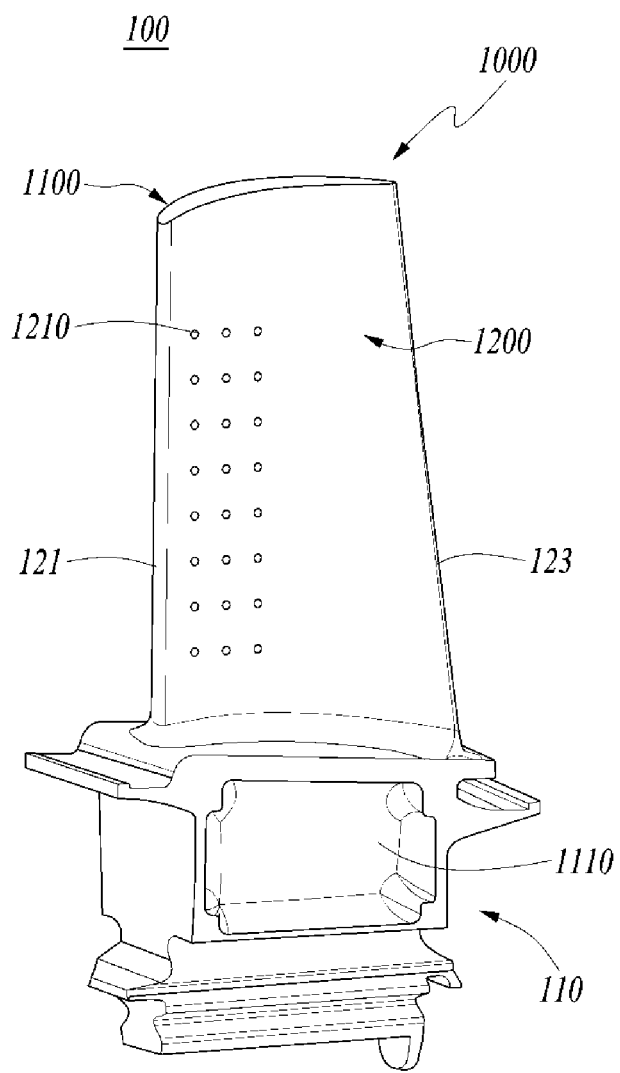
FIG. 3 is a perspective view of a turbine blade including an airfoil according to an exemplary embodiment of the present disclosure.

FIGS. 1 and 2 illustrate a gas turbine 1 according to the present disclosure.

Referring to FIGS. 1 and 2, the gas turbine 1 includes a compressor 10, a combustor 20, and a turbine 30. The compressor 10 serves to compress the incoming air at a high pressure, and delivers the compressed air to the combustor side. The compressor 10 has a plurality of compressor blades installed circumferentially, which rotate with the receipt of a portion of the power generated from the rotation of the turbine 30, so that the air is fed toward the combustor 20 while being compressed by the rotation of the blade combustor. The size and installation angle of the blade may vary depending on the installation location.

The compressed air from the compressor 10 is fed to the combustor 20 so that the compressed air is mixed with fuel and combusted in a combustion chamber-fuel nozzle modules arranged in an annular shape. The high-temperature combustion gas generated due to combustion is discharged to the turbine 30 to rotate the same.

The turbine 30 includes turbine rotor disks 300 that are arranged in a multi-stage manner around a center tie rod 400 that axially couples the turbine rotor disks together. The turbine rotor disk 300 includes a plurality of turbine blades 100 arranged circumferentially. The turbine blade 100 may be coupled to the turbine rotor disk 300 in a dovetail-fit or the like. In addition, a turbine vane 200 is provided between the turbine blades 100 while being fixed to a housing so as to guide the flow direction of the combustion gas passing through the turbine blades 100.

The turbine 30 may include n turbine vanes 200 and n turbine blades 100 alternately arranged along the axial direction of the gas turbine 1. The hot combustion gas passes through the turbine vanes 200 and the turbine blades 100 along the axial direction so as to rotate the turbine blades 100.

The airfoil according to an embodiment of the present disclosure may be an airfoil applied to the turbine blade 100 or the turbine vane 200. Although the airfoil is illustrated in the following description as being applied to the turbine blade 100 (see FIG. 4) of the gas turbine, the airfoil may also be applied to the turbine vane 200 (see FIG. 6). In addition, the technical spirit described herein is not limited to a gas turbine, but may also be applied to a steam turbine and other apparatus including an airfoil.

Figure 4:
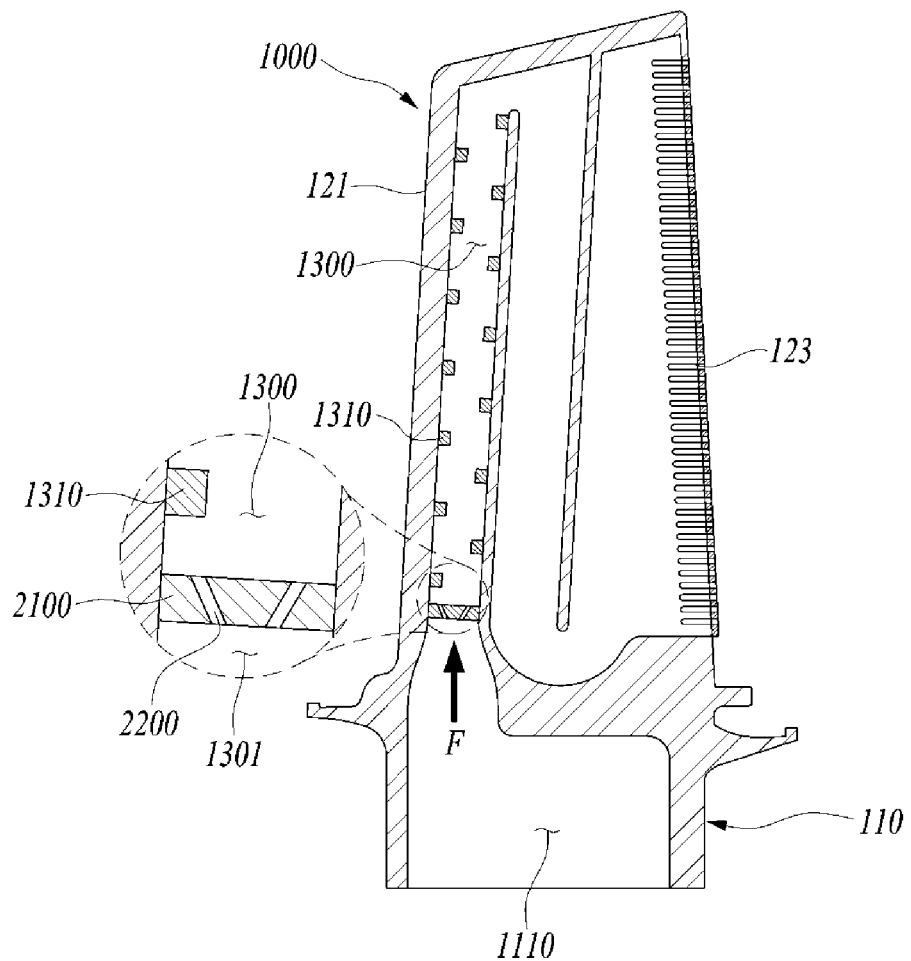
FIG. 4 is a sectional view of a turbine blade including an airfoil according to an exemplary embodiment of the present disclosure.
Figure 5:
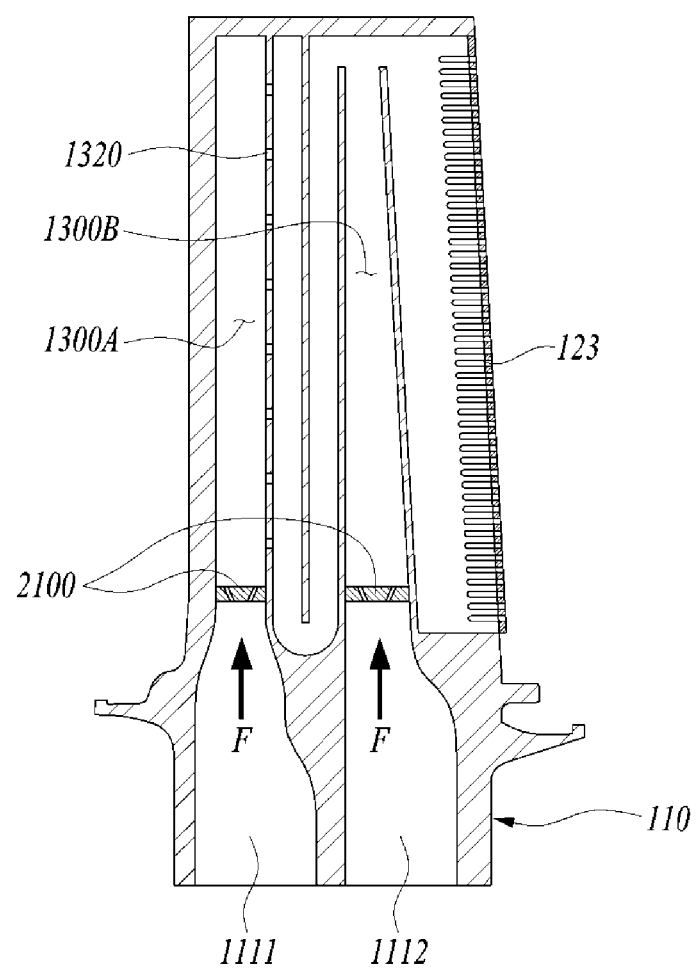
FIG. 5 is a sectional view of a turbine blade including an airfoil according to another exemplary embodiment of the present disclosure.
Figure 6:
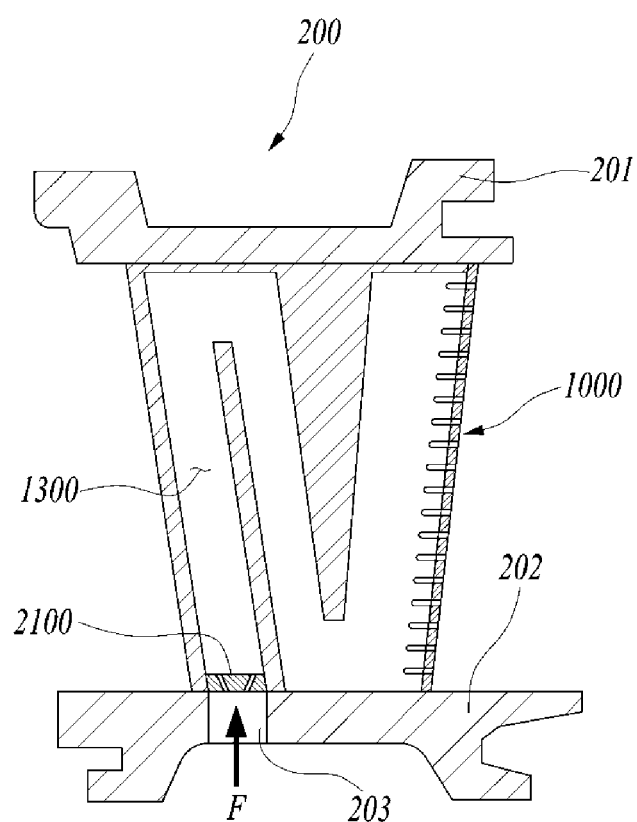
FIG. 6 is a sectional view of a turbine vane including an airfoil according to an exemplary embodiment of the present disclosure.

Each of FIGS. 3-6 illustrates an airfoil according to the present disclosure. FIGS. 4 and 5 respectively illustrate a turbine blade including an airfoil according to exemplary embodiments of the present disclosure, and FIG. 6 illustrates a turbine vane including an airfoil according to an exemplary embodiment of the present disclosure.

Referring to FIGS. 3 to 6, the turbine blade 100 according to an embodiment of the present disclosure includes a root part 110 and an airfoil 1000.

The turbine blade 100 is mounted on the turbine rotor disk 300 to rotate the turbine with high-pressure combustion gas, and includes the lower-side root part 110 fastened to the turbine rotor disk 300, and the upper-side airfoil 1000 which is integrally formed with the root part 110 and is provided on the upper side of the root part 110, wherein the airfoil is configured to rotate with gas pressure difference between its front and rear surfaces, to which gas pressure is applied, to rotate the turbine.

An outer surface of the root part 110 includes a rigid coupling formed by a blade shank and a blade platform protruding axially from the shank. The root part 110 is provided with a root inlet 1110 through which the cooling fluid F flows into the airfoil 1000. The cooling fluid is a portion of compressed air compressed by the compressor 10 or compressed air supplied from the outside, which is then supplied from the compressor 10 to the root part 110 and into the airfoil 1000 of the turbine blade 100 through the root inlet 1110. As the cooling fluid flows into the airfoil 1000, the turbine blade 100 is cooled. Alternatively, the cooling fluid is supplied from the compressor 10 to the root part 110 through an internal flow passage (not shown) connected to the turbine 30, and flows into the airfoil 1000 through the root inlet 1110 so that the turbine blade 100 is cooled.

The airfoil 1000 is disposed above the root part 110. On the other hand, when the airfoil 1000 is provided in the turbine vane 200, the airfoil 1000 is provided between an outer shroud 201 and an inner shroud 202 so that the cooling fluid F flows into the airfoil through an inlet formed in the inner or outer shroud (see FIG. 6).

The airfoil 1000 has a front surface convexly curved outwards as a suction side 1100 and a rear surface concavely curved inwards as a pressure side 1200 so that a difference in pressure applied to the front and rear surfaces of the airfoil 1000 is maximized, allowing for a smooth gas flow around the airfoil.

The airfoil 1000 has a leading edge 121 and a trailing edge 123 at points where the pressure side 1200 and the suction side 1100 meet, wherein the leading edge 121 is an edge of the airfoil 1000 which receives the incoming fluid flow, and the trailing edge 123 is an opposite distal edge out of which the fluid flow flows. In addition, the direction from the root part toward the airfoil tip is referred to as a span direction.

The airfoil 1000 may include a plurality of cooling holes 1210 formed through one or both of the suction side 1100 and the pressure side 1200. As the cooling fluid is discharged to the outside through the cooling holes 1210, an air curtain is formed around the airfoil 1000, thereby externally cooling the airfoil in a so-called film cooling method. Meanwhile, in an embodiment of the present disclosure, there may be no cooling hole 1210 communicating with the cooling passage 1300 formed on the leading edge 121 side.

Referring to FIG. 4, the airfoil 1000 includes a cooling passage 1300 through which cooling fluid flows. While flowing through the cooling passage 1300, the cooling fluid collides with an inner wall of the cooling passage 1300 and absorbs heat from the airfoil 1000 to cool the same.

The cooling passage 1300 is formed to extend generally in the radial direction about the axial direction of the turbine rotor disk 300, that is, in a radial direction of the airfoil 1000. One end of the cooling passage 1300 communicates with the root inlet 1110, and from the root inlet 1110, the cooling passage 1300 alternately extends between the bottom and top of the airfoil 1000, thereby forming a serpentine structure. Of course, this is merely illustrative, so the cooling passage 1300 does not necessarily have the serpentine structure, but may have a simple structure extending only from the bottom to the top of the airfoil 1000. In this case, the cooling fluid flowing through the cooling passage 1300 may flow to an adjacent cooling passage through one or more flow apertures 1320 (see FIG. 5) formed through an inner wall of the cooling passage 1300 disposed on the trailing edge 123 side of the cooling passage 1300.

In an exemplary embodiment of the present disclosure, a disk body 2100 is provided at a specified position in the cooling passage 1300, wherein the disk body 2100 may be provided with a through-hole 2200 through which the cooling fluid passes.

The disc body 2100 decreases a flowing area in cross-section of the cooling passage 1300 to increase the fluid pressure of the cooling fluid. To this end, a perimeter edge of the disk body 2100 is provided on an inner wall of the cooling passage 1300 in a sealed manner, such that flow of the cooling fluid is blocked between the perimeter edge and the inner wall while a portion of the cooling fluid is passed through the through-hole 2200.

According to the present disclosure, the disk body 2100 is formed of at least one disk body 2100 and may include a plurality of disk bodies 2100. The disk bodies 2100 may be respectively provided at various positions in the cooling passage 1300. Meanwhile, the root inlet 1110 of the root part 110 communicates with a passage inlet 1301 of the cooling passage 1300, which communicates with the cooling passage 1300 via the disk body 2100. Since the passage inlet 1301 of the cooling passage 1300 has a small pressure loss of compressed air (cooling fluid) supplied from the compressor 10, the disk body 2100 is preferably provided on the inner wall of the cooling passage 1300 on the passage inlet 1301 side.

The through-hole 2200 is formed through the disk body 2100. The through-hole 2200 allows the cooling fluid to form a vortex while passing through the disk body 2100. The fluid pressure of the cooling fluid, which has increased due to the disk body 2100 sealing the cooling passage 1300, decreases as it passes through the through-hole 2200 so that the cooling fluid diffuses laterally toward the inner wall of the cooling passage while forming a vortex. The cooling fluid diffuses as a vortex which collides with the inner wall of the cooling passage 1300, thereby cooling the air foil 1000.

FIGS. 7A-7D respectively illustrate disk bodies 2100 in which through-holes 2200 having various configurations are formed according to examples of an exemplary embodiment of the present disclosure.

Figure 7A:
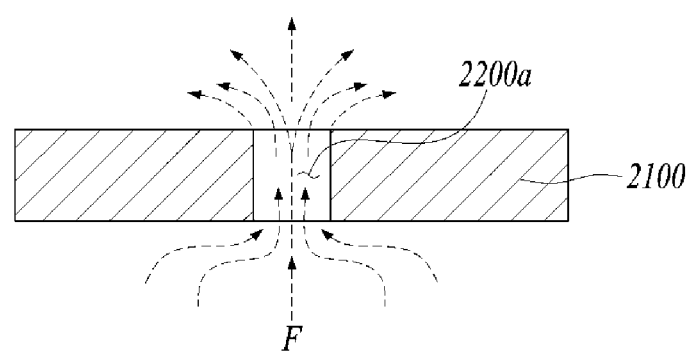
FIGS. 7A-7D are cross-sectional views respectively illustrating disk bodies in which through-holes having various configurations are formed according to an exemplary embodiment of the present disclosure.

As illustrated in FIG. 7A, a through-hole 2200a may be formed in a direction parallel to the radial direction about the axial direction of the turbine rotor disk 300, that is, parallel to a radial direction of the airfoil 1000.

Figure 7B:
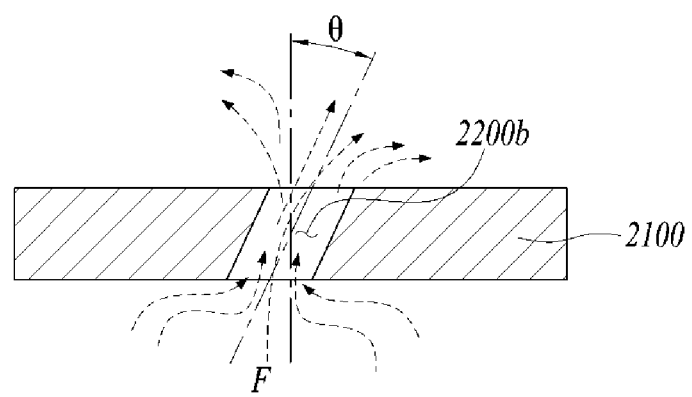

As illustrated in FIG. 7B, a through-hole 2200b may be formed in a direction inclined at a predetermined angle θ with respect to the radial direction. When the through-hole 2200b is formed in an inclined direction, the cooling fluid passes through the through-hole 2200b with the predetermined angle to facilitate vortex formation of the cooling fluid.

Figure 7C:
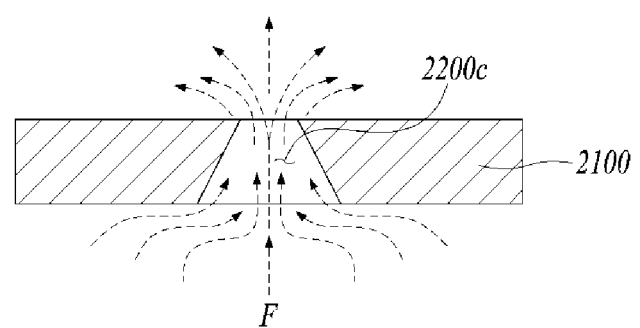

As illustrated in FIG. 7C, a through-hole 2200c may be formed in a frustoconical shape with a wide lower portion (upstream) and a narrow upper portion (downstream). In this case, since the lower portion of the through-hole 2200c is wide, the cooling fluid can flow smoothly into the through-hole 2200c rather than through the through-holes of FIGS. 7A and 7B, so that flow stagnation of the cooling fluid in the disk body 2100 can be eliminated.

Figure 7D:
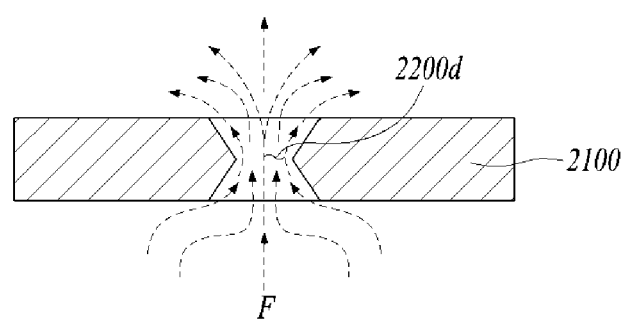

As illustrated in FIG. 7D, a through-hole 2200d may be formed such that its cross-section has a bowtie shape in which a lower frustoconical part and upper frustoconical part upper (an inversion of the lower part) meet and communicate with each other at a midpoint between upstream and downstream sides of the disk body 2100. The lower frustoconical part of the through-hole 2200d has a wide lower portion (upstream) and a narrow upper portion similar to the shape of the through-hole 2200c, and the upper frustoconical part being an inversion of the lower frustoconical part has a wide upper portion (downstream) and a narrow lower portion. In this case, along with the advantage of FIG. 7C, this embodiment has an advantage in that the cooling fluid can be diffused while passing through the through-hole 2200d, thereby facilitating vortex formation of the cooling fluid.

Meanwhile, the through-hole 2200 may have various sizes (diameters) and inclination angles without limitation, since the size and the inclination angle of the through-hole 2200 may be selected and designed by experimental data according to design conditions such as the size of the cross-sectional area and the location of the cooling passage 1300, and the type of the airfoil 1000. Even if a single through-hole 2200 is formed, the cooling fluid forms a vortex after passing through the through-hole 2200, so the number of the through-holes 2200 is not particularly limited.

Referring again to FIG. 4, cooling ribs 1310 may be formed on an inner wall of the cooling passage 1300. The cooling rib 1310 may be a protrusion that protrudes from the inner wall of the cooling passage 1300. Each of the cooling ribs 1310 generate an additional vortex (also referred to as turbulence) in the cooling fluid flowing through the cooling passage 1300, so that the number of times the cooling fluid collides with the inner wall of the cooling passage 1300 increases, thereby improving cooling efficiency.

As the cooling fluid passes through the through-hole 2200, a primary vortex is formed and then collides with the cooling ribs 1310 to form additional vortices, thereby improving the cooling efficiency of the cooling fluid as a whole. The cooling ribs 1310 are preferably formed in the cooling passage on the leading edge 121 side.

Referring to FIG. 5, the root inlet 1110 may be divided into a first inlet 1111 and a second inlet 1112, which separately guide cooling fluid to the airfoil 1000. Thus, the passage inlet 1301 may include separately configured portions for respectively supplying first and second portions of the cooling fluid to separate portions of the cooling passage 1300. In this case, the cooling passage 1300 is formed by a linear passage structure 1300A and a serpentine passage structure 1300B, which may communicate with each other via the flow apertures 1320 to form a combined extension configuration. The linear passage structure 1300A of the cooling passage 1300 may communicate with the first inlet 1111, and the serpentine passage structure 1300B of the cooling passage 1300 may communicate with the second inlet 1112. Thus, the combined extension configuration includes the linear passage structure 1300A in which the cooling passage extends from the bottom to the top of the airfoil 1000, terminating at the top, and the serpentine passage structure 1300B in which the cooling passage alternately extends from the bottom to the top and from the top to the bottom of the airfoil 1000.

FIG. 6 illustrates a turbine vane 200 having an airfoil 1000 with the cooling passage 1300 described above. The airfoil 1000 of the turbine vane 200 is disposed between an outer shroud 201 and an inner shroud 202, and the cooling fluid flows into the airfoil 1000 through at least one fluid inlet 203. The fluid inlet 203 may be formed in the outer shroud 201 or the inner shroud 202.

According to the present disclosure, the through-hole 2200 is formed of at least one through-hole 2200 and may include a plurality of through-holes 2200. The through-holes 2100 may be respectively provided at various positions in the disk body 2100.

Figure 8:
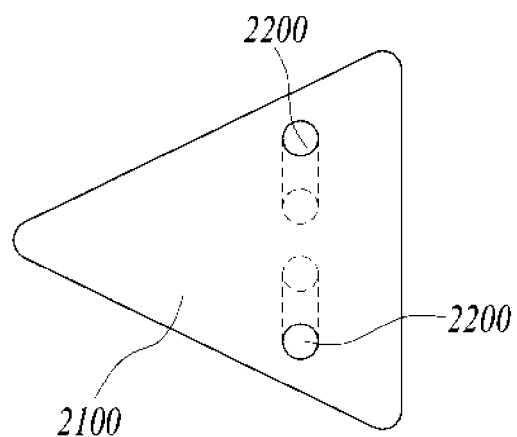
FIG. 8 is a plan view illustrating a disk body in which a pair of through-holes are formed according to an exemplary embodiment of the present disclosure.

FIG. 8 illustrates the disk body 2100 in which a pair of through-holes 2200 are formed according to an embodiment of the present disclosure. Alternatively, one or both of the pair of through-holes 2200 may be a through-hole 2200a, 2200b, 2200c, or 2200d as shown in FIGS. 7A-7D, or a combination these.

In FIG. 8, the disk body 2100 has a generally triangular shape and is formed in the cooling passage 1300 on the leading edge 121 side, to fit where the pressure side 1200 and the suction side 1100 meet. If the disk body 2100 is formed in the cooling passage 1300B adjacent to the cooling passage 1300A on the leading edge 121 side as illustrated in FIG. 5, the disk body 2100 may have a square or rectangular shape, generally, according to the cross-sectional shape of the adjacent cooling passage 1300.

Although the placement position of the pair of through-holes 2200 is not particularly limited, the pair of through-holes 2200 may be arranged such that one of the through-holes is provided toward the suction side 1100, and the other through-hole is provided toward the pressure side 1200 in order to promote cooling of the suction side 1100 and the pressure side 1200 of the airfoil 1000. On the other hand, the pair of through-holes 2200 may be more centrally positioned.

Figure 9:
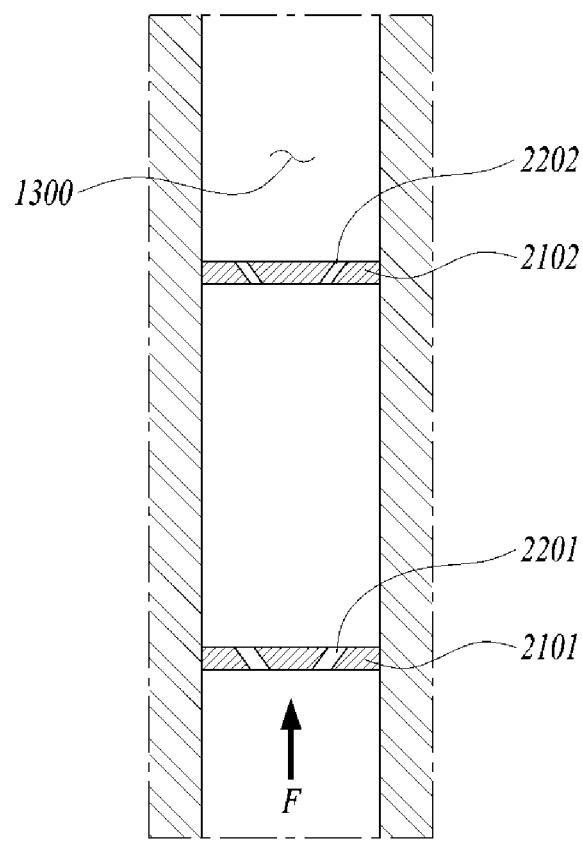
FIG. 9 is a cross-sectional view illustrating a cooling passage in which a plurality of disk bodies are formed according to an exemplary embodiment of the present disclosure.

FIG. 9 illustrates a cooling passage 1300 in which a plurality of disk bodies 2100 are formed according to an exemplary embodiment of the present disclosure.

As illustrated in FIG. 9, a plurality of disk bodies 2101 and 2102 respectively having through-holes 2201 and 2202 may be provided in the cooling passage 1300. Although FIG. 9 illustrates two disk bodies, an exemplary embodiment of the present disclosure may include more than two disposed at predetermined intervals or disposed with predetermined spacing between each other.

The plurality of disk bodies 2101 and 2102 are disposed in position in consideration of the pressure loss of the cooling fluid flowing through the cooling passage 1300.

Since the passage inlet 1301 of the cooling passage 1300 has a small pressure loss of compressed air (cooling fluid) supplied from the compressor 10, a first disk body 2101 is preferably provided on the inner wall of the cooling passage 1300 on the passage inlet 1301 side. A second disk body 2102 is provided at a point where the cooling effect is reduced due to pressure loss of the cooling fluid after passing through the first disk body 2101, in order to increase the fluid pressure of the cooling fluid. The installation position of the second disk body 2102 is not particularly limited, since the installation position may be selected and designed by experimental data according to design conditions such as the size of the cross-sectional area and the location of the cooling passage 1300, and the type of the airfoil 1000.

The first through-hole 2201 formed in the first disk body 2101 and the second through-hole 2202 formed in the second disk body 2102 may be formed in different sizes or different numbers. Each of the first through-hole 2201 and the second through-hole 2202 may be have any configuration illustrated in FIGS. 7A-7D, for example.

The second disc body 2102 is subjected to collision of a cooling fluid that has pressure loss due to collision with the inner wall of the cooling passage 1300 during flowing. Therefore, if the second through-hole 2202 has the same configuration as the first through-hole 2201, the fluid pressure of the cooling fluid after passing through the second through-hole 2202 is lowered, and thus differential cooling may occur in respective cooling passage sections. Accordingly, the second through-hole 2202 may be configured to have increased fluid pressure relative to that of the first through-hole 2201, thereby allowing uniform cooling of the cooling passage on the whole.

For example, the first through-hole 2201 and the second through-hole 2202 may be configured such that the first through-hole 2201 and the second through-hole 2202 have the same size, and fewer of the second through-holes 2202 are provided than the first through-holes 2201, so that an increase in fluid pressure in the second disk body 2102 having the second through-hole 2202 is larger than an increase in fluid pressure in the first disk body 2101, thereby compensating for the pressure loss.

In addition, for example, the first through-hole 2201 and the second through-hole 2202 may be configured such that the first through-hole 2201 and the second through-hole 2202 have the same number, and the second through-hole 2202 is smaller than the first through-hole 2201, so that an increase in fluid pressure in the second disk body 2102 is larger than an increase in fluid pressure in the first disk body 2101, thereby compensating for the pressure loss.

Generally assuming that the number of through-holes multiplied by the size of the through-holes equals a through area, it is preferable to form the through area of the second through-hole 2202 smaller than that of the first through-hole 2201.

Next, the cooling performance of the present airfoil and a contemporary airfoil will be described qualitatively with reference to FIGS. 10 to 12.

Figure 10:
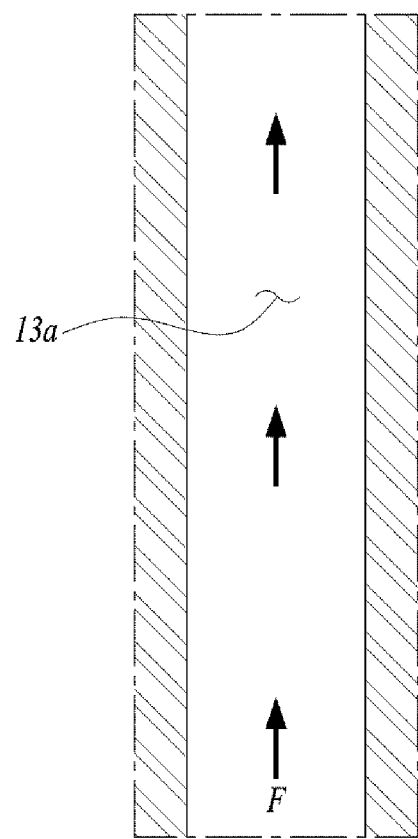
FIGS. 10 and 11 are views conceptually illustrating a cooling process by a cooling fluid in a contemporary airfoil.
Figure 11:
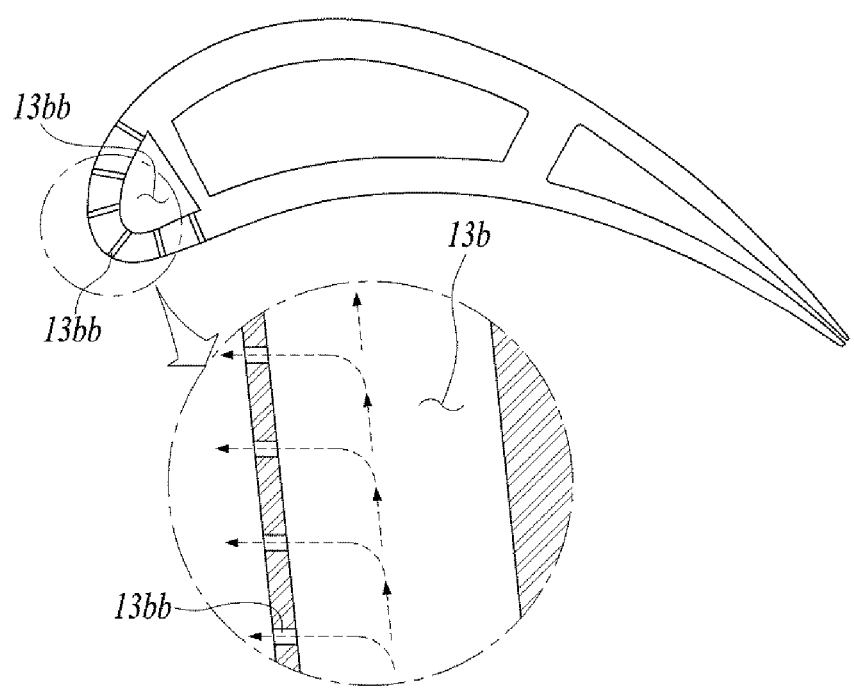
Figure 12:
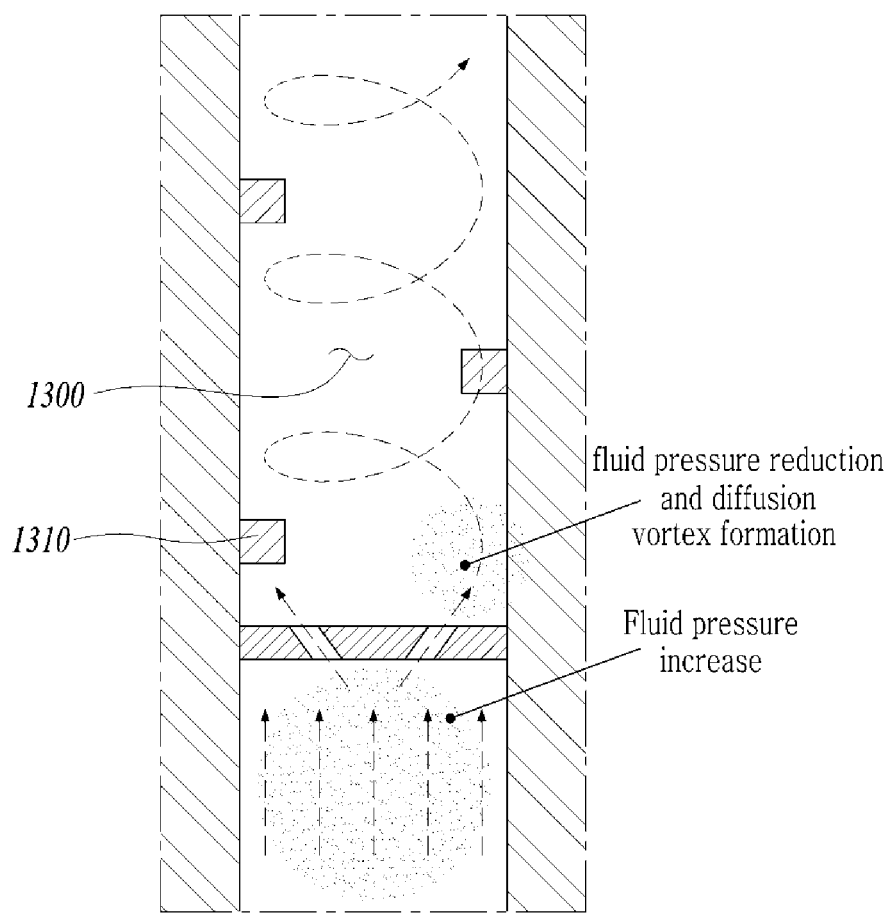
FIG. 12 is a view conceptually illustrating a cooling process by a cooling fluid in an airfoil according to exemplary embodiments of the present disclosure.

FIGS. 10 and 11 conceptually illustrate a cooling process by a cooling fluid in a contemporary airfoil, and FIG. 12 conceptually illustrates a cooling process by a cooling fluid in an airfoil according to exemplary embodiments of the present disclosure.

In the contemporary airfoil of FIG. 10, the cooling fluid flowing into a cooling passage 13a flows along a cooling passage 13a while maintaining the inflow direction. During flowing, since a portion of the cooling fluid collides with an inner wall of the cooling passage 13a to cool the airfoil, the cooling performance deteriorates due to a relatively small amount of collision of the cooling fluid with the inner wall.

In addition, in the contemporary airfoil of FIG. 11, a cooling passage 13b is provided with cooling holes 13bb through which cooling fluid is discharged to the outside. During flowing, a portion of the cooling fluid collides with an inner wall of the cooling passage 13b to cool the airfoil, and a portion of the cooling fluid is discharged to the outside of the airfoil through the cooling holes 13bb, and during the discharge, the cooling fluid additionally collides with the cooling holes 13bb and the inner wall of the cooling passage 13b, so that the cooling performance is improved over that of FIG. 10. However, since a high-temperature combustion gas may enter the cooling passage 13b while the combustion gas is being discharged to the outside through the cooling holes 13bb, an influx of the combustion gas may cause a deterioration of cooling performance.

On the other hand, according to embodiments of the present disclosure as illustrated in FIG. 12, while flowing into the cooling passage 1300 through the root inlet 1110 of the root part 110, the flowing fluid may stagnate temporally around the disk body 2100 so that the fluid pressure increases. As the cooling fluid passes through the disk body 2100 through the through-hole 2200, the increased fluid pressure of the cooling fluid decreases so that the cooling fluid diffuses toward the inner wall of the cooling passage 1300 while forming a vortex. Since the cooling fluid diffuses in a vortex shape toward and collides with the inner wall of the cooling passage 1300, the cooling performance for the airfoil is improved. In addition, the cooling performance can be improved without forming the cooling holes 13bb of FIG. 11.

The embodiments and accompanying drawings disclosed herein merely illustrate a part of the technical spirit included in the present disclosure. Further, obviously, various modifications and specific examples easily conceivable by those skilled in the art within the technical scope of the present disclosure may be within the scope of the present disclosure.

What is claimed is:

1. An airfoil comprising:
   a cooling passage;
   at least one disk body disposed on an inner wall of the cooling passage and configured to reduce a flow cross-sectional area of the cooling passage to increase a fluid pressure of cooling fluid flowing through the cooling passage; and
   at least one through-hole formed in each of the at least one disk body such that the cooling fluid flows through the at least one through-hole and forms a vortex on a downstream side of the at least one through-hole,
   wherein each of the at least one through-hole has a bowtie cross-sectional shape formed of a lower frustoconical part and frustoconical part, the lower frustoconical part of the through-hole having a wide lower portion and a narrow upper portion and the upper frustoconical part of the through-hole being an inversion of the lower frustoconical part and having a wide upper portion and a narrow lower portion.

2. The airfoil according to claim 1, wherein the cooling passage includes an inlet supplied with the cooling fluid and an end opposite to the inlet.

3. The airfoil according to claim 2, wherein the at least one disk body is disposed at the inlet of the cooling passage and is configured to increase the fluid pressure of the cooling fluid flowing into the cooling passage.

4. The airfoil according to claim 3,
wherein the at least one through-hole includes a plurality of through-holes, and
wherein the at least one disk body includes a plurality of disk bodies, each of the plurality of disk bodies having the at least one through-hole.

5. The airfoil according to claim 4, wherein the plurality of disk bodies includes:
a first disk body disposed at the inlet of the cooling passage; and
a second disk body disposed in the cooling passage between the first disk body and end of the cooling passage opposite the inlet.

6. The airfoil according to claim 5,
wherein each of the plurality of through-holes has an equal size, and
wherein the second disk body has fewer through-holes than the first disk body.

7. The airfoil according to claim 5,
wherein each of the first and second disk bodies has an equal number of through-holes, and
wherein each of the plurality of through-holes formed in the second disk body is smaller than any one of the plurality of through-holes of the first disk body.

8. The airfoil according to claim 5,
wherein the plurality of through-holes are configured such that a number of through-holes of the plurality of through-holes multiplied by a size of each of the plurality of through-holes equals a through area of a corresponding disk body of the plurality of disk bodies, and
wherein the through area of the second disk body is smaller than the through area of the first disk body.

9. The airfoil according to claim 1, wherein each of the at least one through-hole is formed in a direction parallel to a radial direction of the airfoil.

10. The airfoil according to claim 1, wherein each of the at least one through-hole is formed in a direction inclined at a predetermined angle with respect to a radial direction of the airfoil.

11. The airfoil according to claim 1, wherein each of the at least one through-hole has a frustoconical shape with a wide lower portion and a narrow upper portion.

12. The airfoil according to claim 1, further comprising a cooling rib disposed on the inner wall of the cooling passage downstream of the at least one disk body, the cooling protruding into the cooling passage and being configured to form an additional vortex in the cooling fluid that passes through the at least one disk body.

13. The airfoil according to claim 2,
wherein the inlet of the cooling passage includes at least one inlet including a first inlet supplied with a first portion of the cooling fluid and a second inlet supplied with a second portion the cooling fluid and an end opposite to the inlet, and
wherein the at least one disk body is disposed at each of the first and second inlets of the cooling passage and is configured to increase the fluid pressure of each of the first and second portions of the cooling fluid flowing into the cooling passage.

14. The airfoil according to claim 13, wherein the cooling passage is formed by a linear passage structure and a serpentine passage structure forming a combined extension configuration with the linear passage structure, the linear passage structure configured to communicate with the first inlet, the serpentine passage structure configured to communicate with the second inlet.

15. The airfoil according to claim 14, wherein the linear passage structure and the serpentine passage structure communicate with each other via flow apertures formed in the inner wall of the cooling passage.

16. The airfoil according to claim 14,
wherein the linear passage structure of the cooling passage extends from a bottom to a top of the airfoil and terminates at the top, and
wherein the serpentine passage structure of the cooling passage alternately extends from the bottom to the top and from the top to the bottom of the airfoil.

17. A gas turbine comprising:
a compressor configured to compress an incoming air;
a combustor configured to produce combustion gas by mixing the compressed air with fuel and combusting an air-fuel mixture; and
a turbine configured to generate power from the combustion gas, the turbine comprising:
a turbine vane for guiding the combustion gas along a path through which the combustion gas flows, and
a turbine blade for rotating with the combustion gas flowing through the path,
wherein at least one of the turbine vane and the turbine blade includes an airfoil comprising:
a cooling passage;
at least one disk body disposed on an inner wall of the cooling passage and configured to reduce a flow cross-sectional area of the cooling passage to increase a fluid pressure of cooling fluid flowing through the cooling passage; and
at least one through-hole formed in each of the at least one disk body such that the cooling fluid flows through the at least one through-hole and forms a vortex on a downstream side of the at least one through-hole,
wherein each of the at least one through-hole has a bowtie cross-sectional shape formed of a lower frustoconical part and upper frustoconical part, the lower frustoconical part of the through-hole having a wide lower portion and a narrow upper portion and the upper frustoconical part of the through-hole being and inversion of the lower frustoconical part and having a wide upper portion and a narrow lower portion.

18. The gas turbine according to claim 17, wherein the turbine blade comprises a root part fastened to a turbine rotor disk of the turbine, and the airfoil is integrally formed with the root part such that the airfoil is positioned on an upper portion of the root part so as to be rotated by the combustion gas.

19. The gas turbine according to claim 17, wherein the airfoil of the turbine vane is disposed between an outer shroud and an inner shroud of the turbine, and the cooling fluid flows into the airfoil through at least one fluid inlet formed in the inner or outer shroud.

* * * * *